(12) United States Patent
Ichitsubo

(10) Patent No.: US 9,179,163 B2
(45) Date of Patent: Nov. 3, 2015

(54) DEVICE AND METHOD FOR PROCESSING IMAGE

(71) Applicant: Sony Corporation, Tokyo (JP)

(72) Inventor: Taro Ichitsubo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/509,134

(22) Filed: Oct. 8, 2014

(65) Prior Publication Data

US 2015/0104109 A1 Apr. 16, 2015

(30) Foreign Application Priority Data

Oct. 15, 2013 (JP) ................................. 2013-214600

(51) Int. Cl.
| | |
|---|---|
| *H04N 19/65* | (2014.01) |
| *H04N 19/86* | (2014.01) |
| *H04N 19/44* | (2014.01) |
| *H04N 1/407* | (2006.01) |
| *H04N 9/73* | (2006.01) |

(52) U.S. Cl.
CPC ............. *H04N 19/65* (2014.11); *H04N 1/4078* (2013.01); *H04N 9/735* (2013.01); *H04N 19/44* (2014.11); *H04N 19/86* (2014.11)

(58) Field of Classification Search
USPC .............. 382/232–233, 274–275; 375/240.27
See application file for complete search history.

(56) References Cited

U.S. PATENT DOCUMENTS

| | | | | |
|---|---|---|---|---|
| 5,790,265 | A  * | 8/1998 | Shikakura | 358/426.09 |
| 5,838,455 | A  * | 11/1998 | Imaizumi et al. | 358/3.1 |
| 6,795,063 | B2 * | 9/2004 | Endo et al. | 345/204 |
| 7,545,393 | B2 * | 6/2009 | Kanai | 345/690 |
| 8,300,707 | B2 * | 10/2012 | Sawa | 375/240.27 |
| 8,503,542 | B2 * | 8/2013 | Pao | 375/240.29 |
| 8,923,613 | B2 * | 12/2014 | Nomura et al. | 382/166 |

FOREIGN PATENT DOCUMENTS

JP 2008-503185 A 1/2008

* cited by examiner

*Primary Examiner* — Ishrat I Sherali
(74) *Attorney, Agent, or Firm* — Wolf, Greenfield & Sacks, P.C.

(57) ABSTRACT

An image processing device includes a decompression unit configured to decompress a compressed image signal, a gradation-dependent correction unit configured to perform gradation-dependent correction on the decompressed image signal, the gradation-dependent correction being a correction process in which the amount of correction varies among luminance gradations, and a compression error correction unit configured to perform compression error correction in which input luminance values are selectively offset, on the decompressed image signal which has yet to be subjected to the gradation-dependent correction.

6 Claims, 9 Drawing Sheets

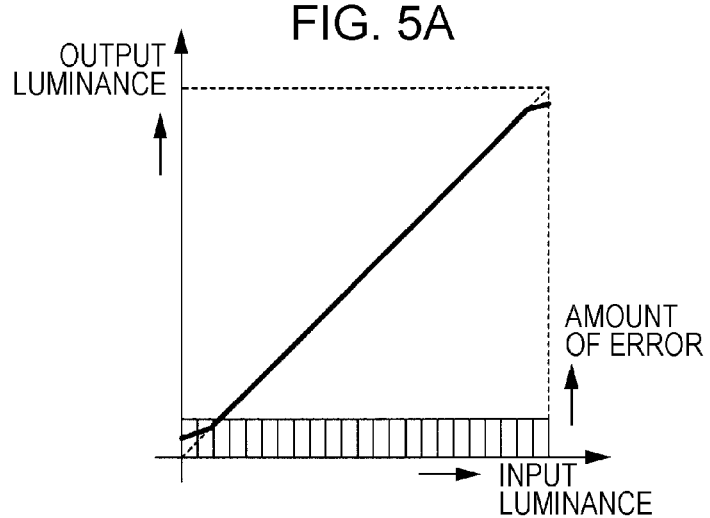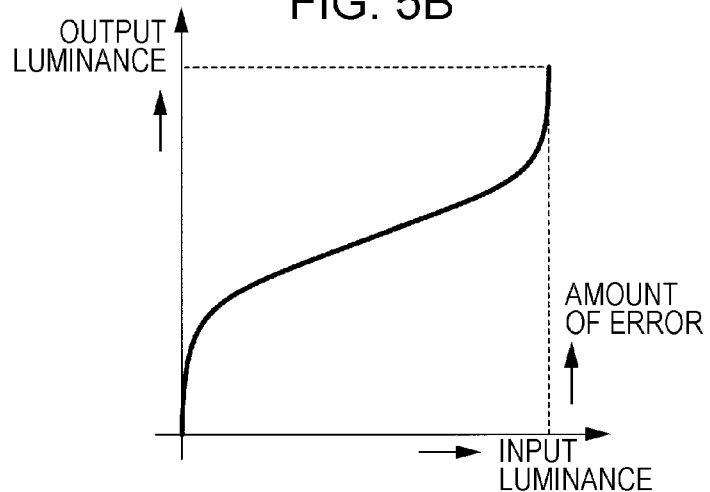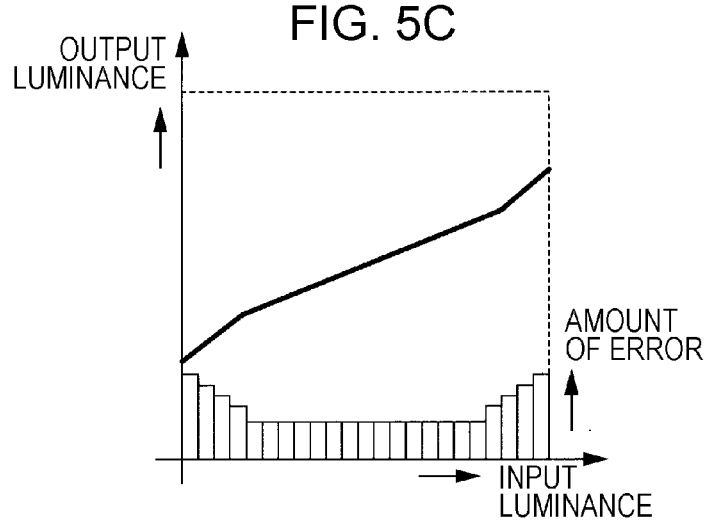

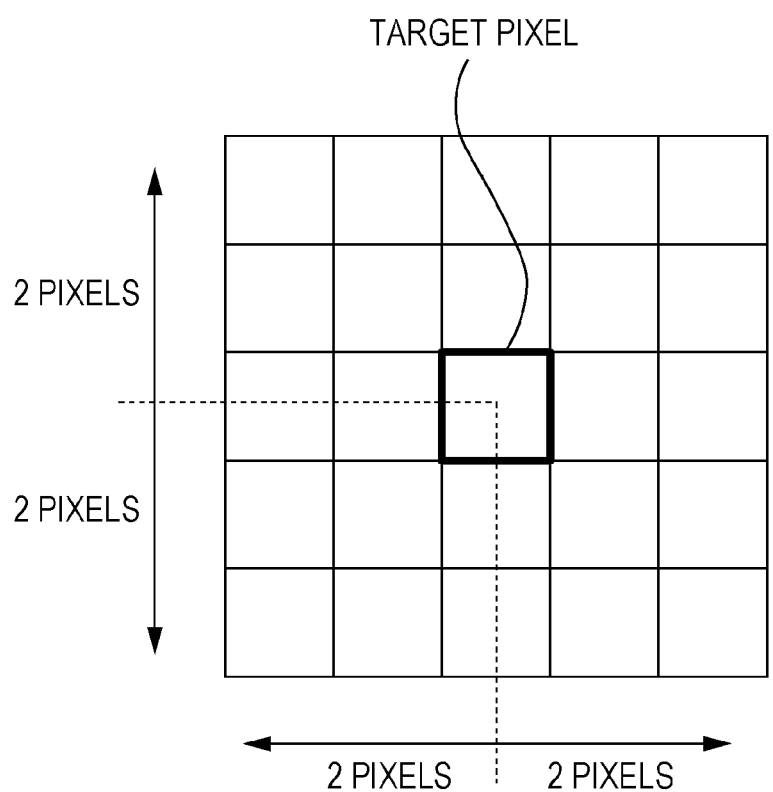

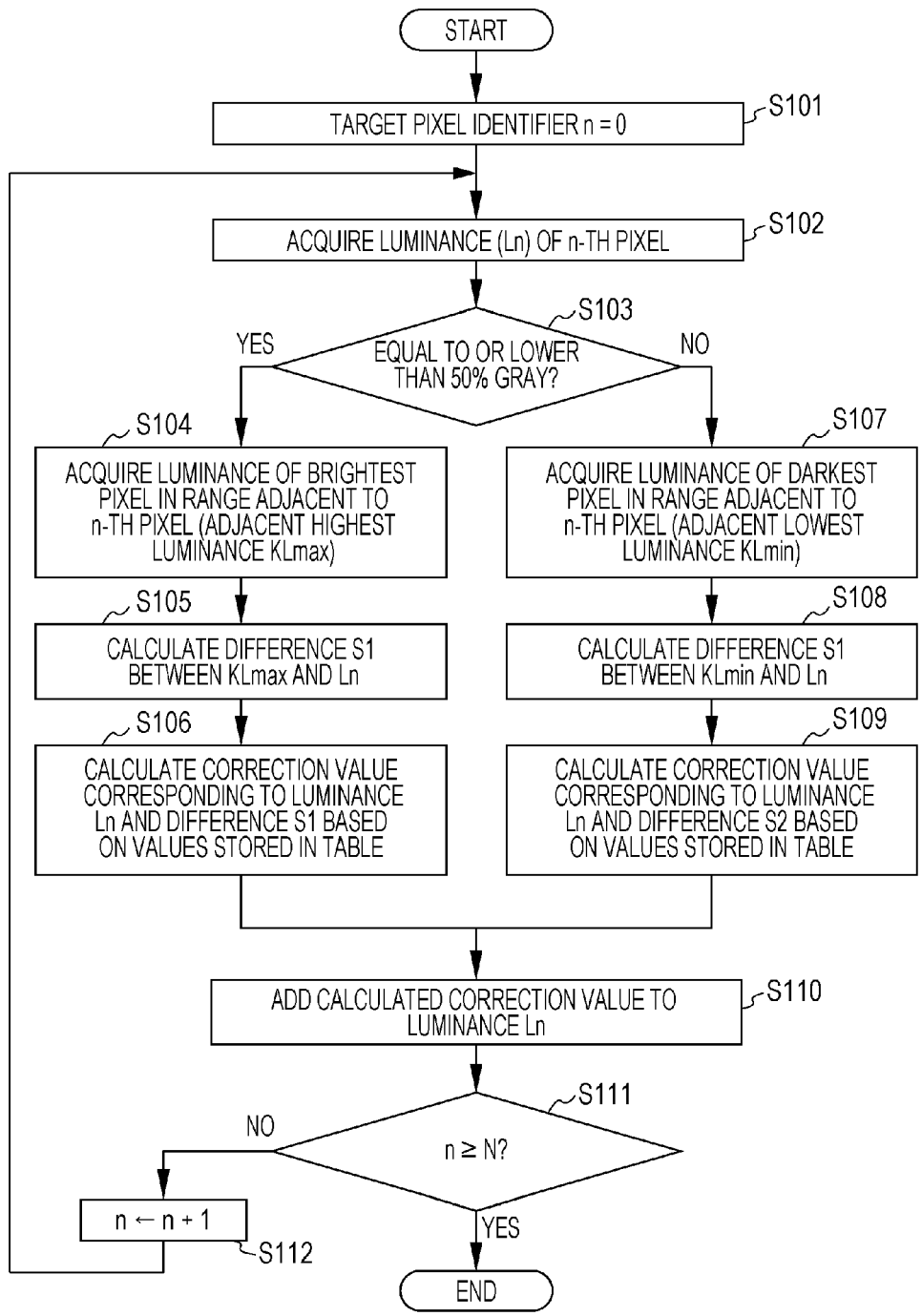

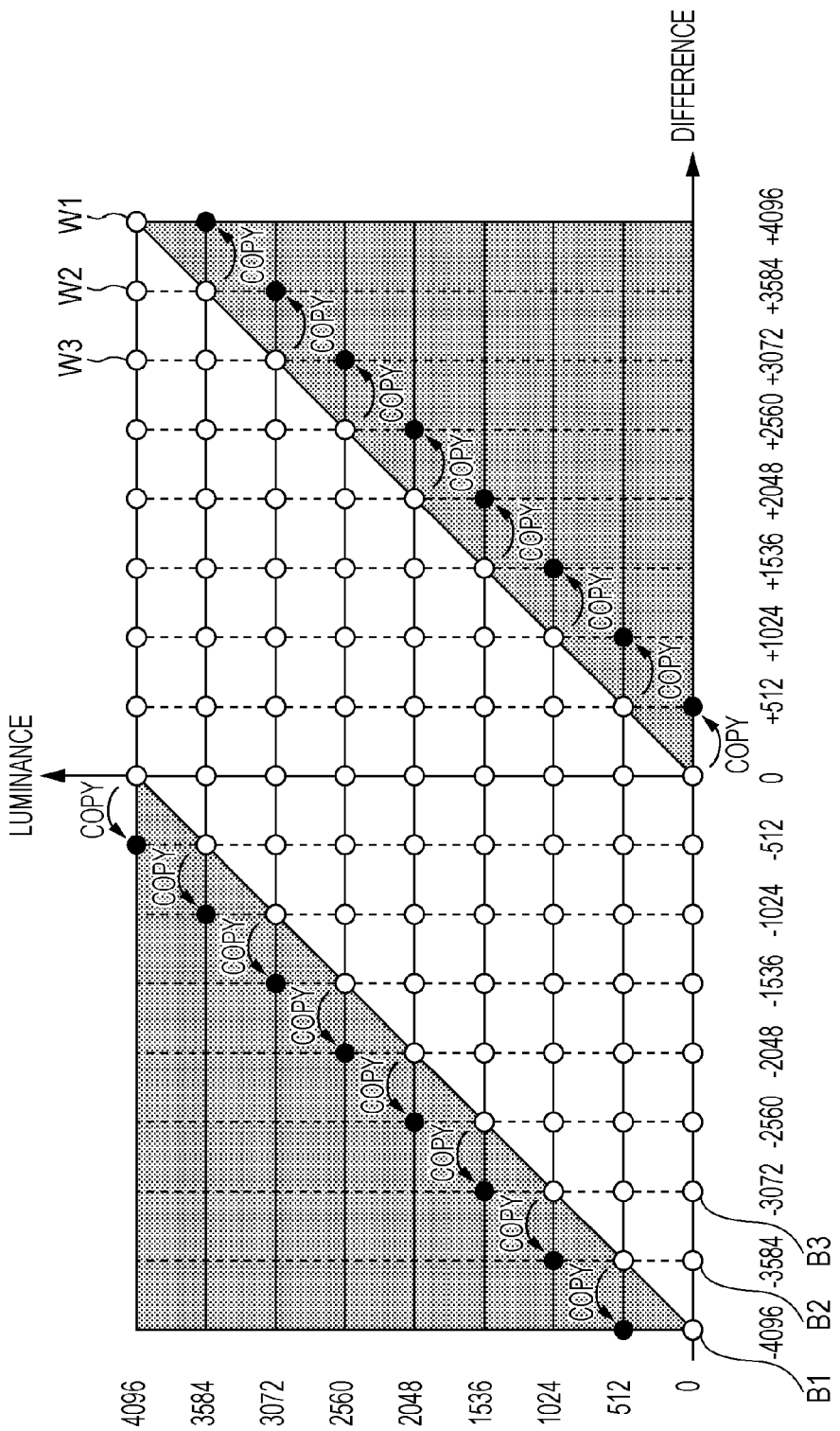

DEVICE AND METHOD FOR PROCESSING IMAGE

CROSS REFERENCE TO RELATED APPLICATIONS

This application claims the benefit of Japanese Priority Patent Application JP 2013-214600 filed Oct. 15, 2013, the entire contents of which are incorporated herein by reference.

BACKGROUND

The present technology relates to an image processing device and method for processing an image signal and in particular to a technology field for reducing image quality degradation which may occur when a compressed image signal is decompressed and/or when gradation-dependent correction (a correction process in which the amount of correction varies among luminance gradations), such as gamma correction, is performed on the decompressed image signal.

In the field of image processing, an image is compressed to reduce the amount of image data. Examples of typical image compression methods include differential pulse-code modulation (PCM). With respect to differential PCM, it is known that when there is a large difference in luminance between adjacent pixels, the luminance errors are increased. As seen above, a luminance error typically occurs when an image is compressed.

Hereafter, a luminance error which occurs when an image is compressed (a luminance error caused by compression or decompression) will be referred to as a "compression error".

Image display devices include ones which perform gradation-dependent correction on the basis of characteristics of the display panel, or the like. The gradation-dependent correction refers to a correction process in which the amount of correction varies among luminance gradations and is, for example, a gamma correction process.

Japanese Unexamined Patent Application Publication (Translation of PCT Application) No. 2008-503185 discloses a display system which performs gamma correction.

SUMMARY

In displaying an image, it is conceivable to decompress a compressed image signal and then to perform gradation-dependent correction, such as gamma correction, on the decompressed image signal.

However, performance of gradation-dependent correction on the decompressed image signal results in increases in compression errors. For example, correction curves with respect to black and white pixels in a gamma correction process are believed to be steep and therefore relatively large compression errors occur with respect to the black and white pixels.

As seen above, when a compressed image signal is decompressed and then subjected to gradation-dependent correction, the compression errors are increased according to the gradation-dependent correction curve. For the pixel having the increased compression error, a large error may occur between the original luminance and the actual luminance, and such an error may be visually recognized as that indicating image quality degradation.

Accordingly, it is desirable to reduce image quality degradation resulting from the increases of the compression errors caused by gradation-dependent correction.

According to an embodiment of the present technology, an image processing device includes a decompression unit configured to decompress a compressed image signal, a gradation-dependent correction unit configured to perform gradation-dependent correction on the decompressed image signal, the gradation-dependent correction being a correction process in which the amount of correction varies among luminance gradations, and a compression error correction unit configured to perform compression error correction in which input luminance values are selectively offset, on the decompressed image signal which has yet to be subjected to the gradation-dependent correction.

Thus, it is possible to shift the luminance values to portions other than steep portions of the gradation-dependent correction curve prior to the gradation-dependent correction.

In the image processing device according to the embodiment of the present technology, the gradation-dependent correction unit preferably performs gamma correction as the gradation-dependent correction, and the compression error correction unit preferably offsets, as the compression error correction, luminance values of black and white pixels in the image signal in such a manner that the luminance values are shifted toward halftones.

Thus, it is possible to shift the luminance values to portions other than steep portions of a gamma correction curve when the gradation-dependent correction is gamma correction.

The image processing device according to the embodiment of the present technology preferably further includes a control unit configured to determine which of a moving image and a still image is displayed based on the image signal and to perform control so that the compression error correction is not performed when the still image is displayed.

Thus, when still images are displayed, the compression error correction is not performed. This is because image quality degradation caused by increases in the compression errors is not easily visually recognized when still images are displayed.

In the image processing device according to the embodiment of the present technology, as the compression error correction, the compression error correction unit preferably offsets the luminance value of the black pixel using a value corresponding to a difference in luminance between the black pixel and a pixel having the highest luminance of pixels in a predetermined range adjacent to the black pixel and offsets the luminance value of the white pixel using a value corresponding to a difference in luminance between the white pixel and a pixel having the lowest luminance of pixels in a predetermined range adjacent to the white pixel.

Thus, the luminance of the black pixel is offset using a value corresponding to the difference in luminance between the black pixel and the brightest pixel of the pixels adjacent to the black pixel, and the luminance of the white pixel is offset using a value corresponding to the difference in luminance between the white pixel and the darkest pixel of the pixels adjacent to the white pixel.

In the image processing device according to the embodiment of the present technology, the amount of offset of the luminance value of the black pixel is preferably set to a larger value than the amount of offset of the luminance value of the white pixel in the compression error correction.

Thus, the luminance values of the black and white pixels are offset by proper amounts of offset corresponding to the steepness of steep portions of the gamma correction curve.

According to another embodiment of the present technology, a method for processing an image includes decompressing a compressed image signal, performing gradation-dependent correction on the decompressed image signal, the gradation-dependent correction process being a correction process in which the amount of correction varies among luminance gradations, and performing compression error correction in which input luminance values are selectively offset, on the decompressed image signal which has yet to be subjected to the gradation-dependent correction.

As with the image processing device according to the embodiment of the present technology, the method for processing an image according to the other embodiment of the present technology can shift the luminance values to portions other than steep portions of the gradation-dependent correction curve prior to the gradation-dependent correction.

According to the embodiments of the present technology, image quality degradation resulting from the increases in the compression errors caused by the gradation-dependent correction can be reduced.

Note that the effects described above are illustrative only and any effect described in the present disclosure can be obtained.

BRIEF DESCRIPTION OF THE DRAWINGS

FIGS. 5A to 5C are graphs showing the outline of compression error correction of an embodiment;

FIG. 6 is a diagram showing an adjacent range.

FIG. 8 is a flowchart showing specific process steps performed by a compression error correction unit; and FIG. 9 is a diagram showing a correction value table.

DETAILED DESCRIPTION OF EMBODIMENTS

Figure 1:
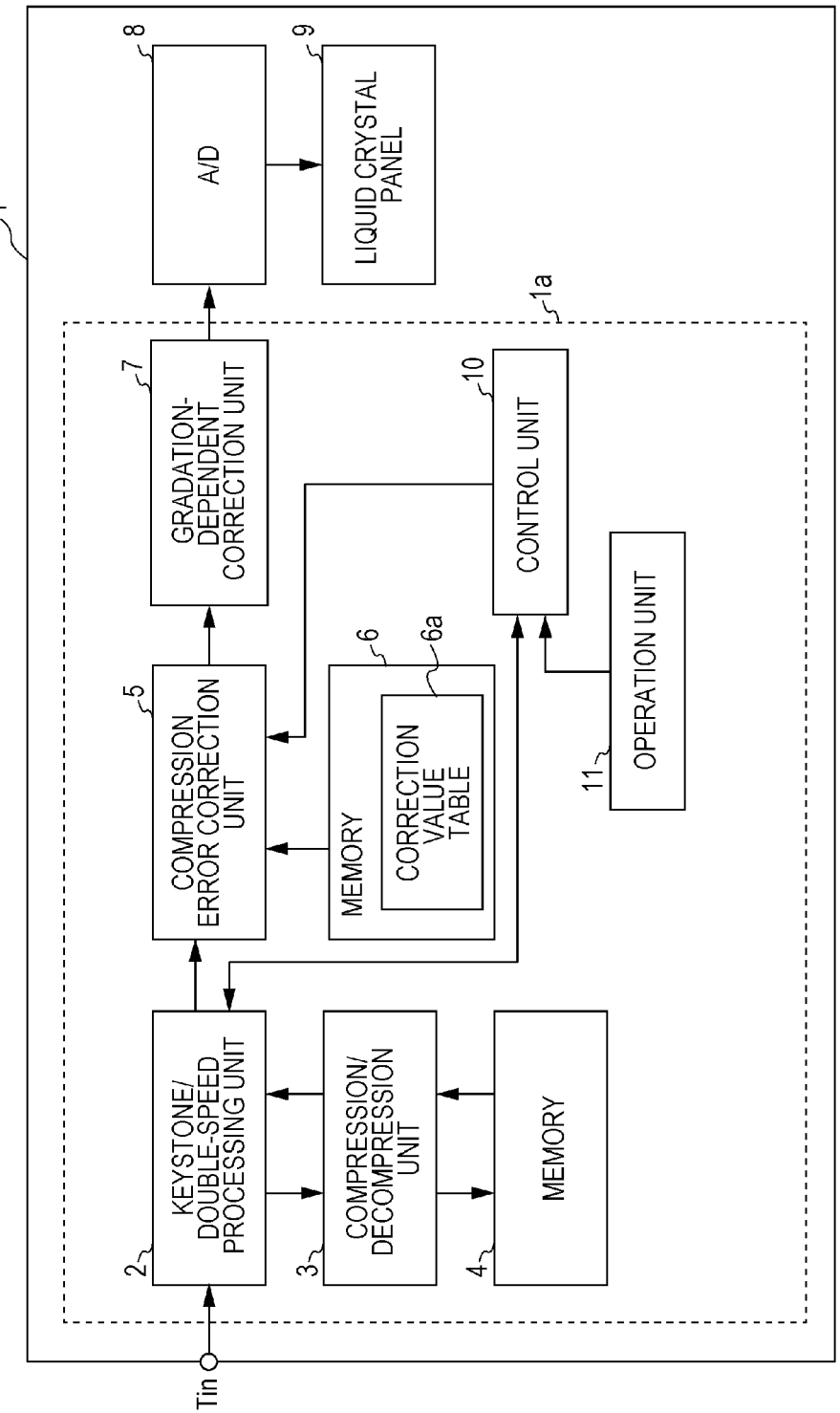
FIG. 1 is a block diagram showing the internal configuration of a display device to which an image processing device according to the present technology is applied.

Now, an embodiment will be described in the following order.
1. Configuration of Display Device
2. Degradation of Image Quality Resulting from increases in Compression Errors
3. Compression Error Correction
4. Summary of Embodiment
5. Modification
6. Present Technology
1. Configuration of Display Device FIG. 1 is a block diagram showing the internal configuration of a display device 1 to which an image processing device according to the present technology is applied.

The display device 1 includes an image input terminal Tin to which an image signal is inputted, a keystone/double-speed processing unit 2, a compression/decompression unit 3, a memory 4, a compression error correction unit 5, a memory 6, a gradation-dependent correction unit 7, an A/D converter 8, a liquid crystal panel 9, a control unit 10, and an operation unit 11.

The display device 1 of the present embodiment is formed as a projector. Note that an optical system included in the display device 1 serving as a projector is not shown in FIG. 1. The optical system includes a light source configured to emit light to be put into the liquid crystal panel 9 and a projection lens configured to project light coming through the liquid crystal panel 9 onto an object such as a screen.

Of the components shown in FIG. 1, the keystone/double-speed processing unit 2, the compression/decompression unit 3, the memory 4, the compression error correction unit 5, the memory 6, the gradation-dependent correction unit 7, the control unit 10, and the operation unit 11 form an image processing unit 1a. The image processing unit 1a corresponds to an image processing device according to an embodiment of the present technology.

The image input terminal Tin is a digital image signal input terminal, such as a High-Definition Multimedia Interface® (HDMI) terminal.

The keystone/double-speed processing unit 2 performs keystone correction (trapezoidal distortion correction) on an image signal inputted through the image input terminal Tin in accordance with an instruction from the control unit 10 (to be discussed later). The keystone/double-speed processing unit 2 also performs double-speed processing (to be discussed later).

The compression/decompression unit 3 compresses the image signal received from the keystone/double-speed processing unit 2 by, for example, differential pulse-code modulation (PCM) and then writes the compressed signal to the memory 4, as well as reads and decompresses the compressed image signal written to the memory 4 and provides the decompressed signal to the keystone/double-speed processing unit 2.

The memory 4 is a frame memory including a dynamic random access memory (DRAM) or the like.

The keystone/double-speed processing unit 2 performs double-speed processing in which the same frame image is outputted twice, to correspond to the AC drive of the liquid crystal panel 9 (to be discussed later). The keystone/double-speed processing unit 2 also causes the compression/decompression unit 3 to compress one frame image inputted through the image input terminal Tin and to temporarily place the compressed frame image in the memory 4. This temporary placement of the frame image in the memory 4 allows a reduction in the capacity of the memory 4 necessary to perform double-speed processing.

The decompressed image signal outputted by the keystone/double-speed processing unit 2 is inputted to the gradation-dependent correction unit 7 through the compression error correction unit 5.

Note that the compression error correction unit 5, the memory 6, and a correction value table 6a stored in the memory 6 will be discussed later.

The gradation-dependent correction unit 7 performs gradation-dependent correction on the inputted image signal. The gradation-dependent correction process refers to a correction process in which the amount of correction varies among luminance gradations. In the present embodiment, the gradation-dependent correction unit 7 performs gamma correction as gradation-dependent correction.

The resulting image signal is converted into an analog signal by the A/D converter 8 and then inputted to the liquid crystal panel 9.

The liquid crystal panel 9 is, for example, a transmissive liquid crystal panel and displays an image on the basis of the inputted image signal. In the present embodiment, the display of the liquid crystal panel 9 is driven by so-called AC drive. The AC drive refers to a display drive method by which positive luminance and negative luminance are alternately written as the luminance of each pixel in the same frame image.

The control unit 10 includes a microcomputer including a central processing unit (CPU), a read only memory (ROM), and a random access memory (RAM) and controls the entire display device 1 by performing a process on the basis of a program stored in the ROM.

The operation unit 11 is coupled to the control unit 10. The operation unit 11 includes various types of operators, including buttons with which the user inputs an operation, and provides, to the control unit 10, an operation input signal corresponding to an operation inputted with any operator.

The control unit 10 performs a process corresponding to the operation input signal from the operation unit 11 on the basis of the program. In this way, the process corresponding to the operation inputted by the user is performed in the display device 1. For example, based on the operation input signal from the operation unit 11, the control unit 10 causes the keystone/double-speed processing unit 2 to perform keystone correction.

The control unit 10 also determines which of moving images and still images are displayed on the liquid crystal panel 9, on the basis of an image signal inputted through the image input terminal Tin. For example, the control unit 10 determines which of moving images and still images are displayed on the liquid crystal panel 9, on the basis of motion components of an image signal inputted through the image input terminal Tin.

The compression error correction unit 5 performs compression error correction on the basis of this determination. This will be described later.

2. Degradation of Image Quality Resulting from Increases in Compression Errors

As described above, the image processing unit 1a decompresses the compressed image signal and then performs gradation-dependent correction, such as gamma correction, on the decompressed image signal, whereas the luminance errors caused by the compression and decompression (hereafter referred to as the "compression errors") are increased by the gradation-dependent correction.

Figure 2A:
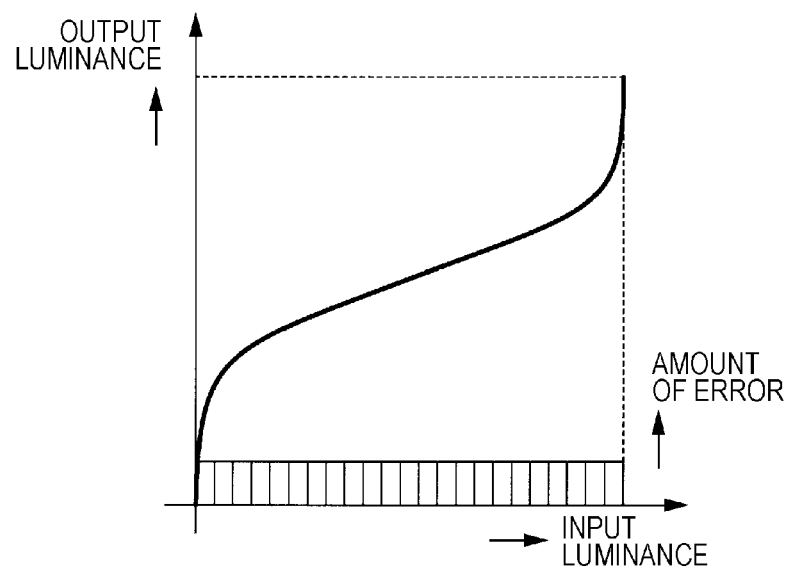
FIGS. 2A and 2B are graphs showing that compression errors are increased by gamma correction.
Figure 2B:
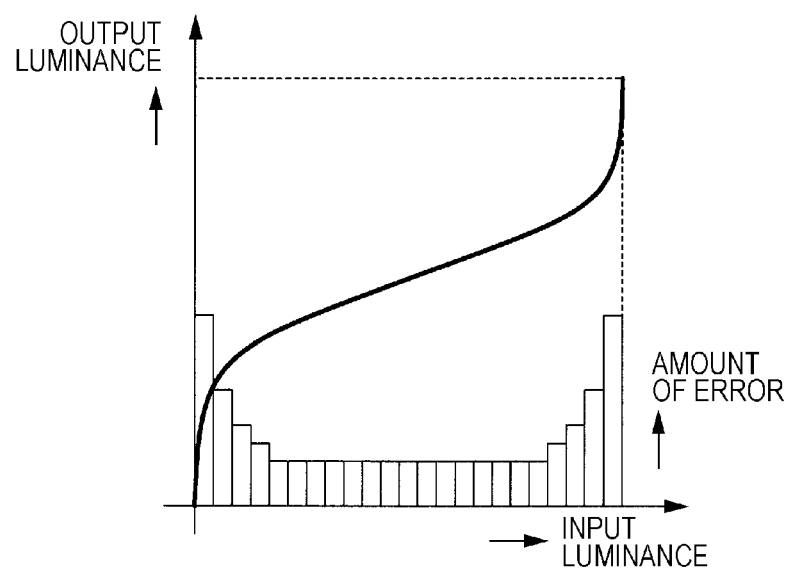
Figure 3A:
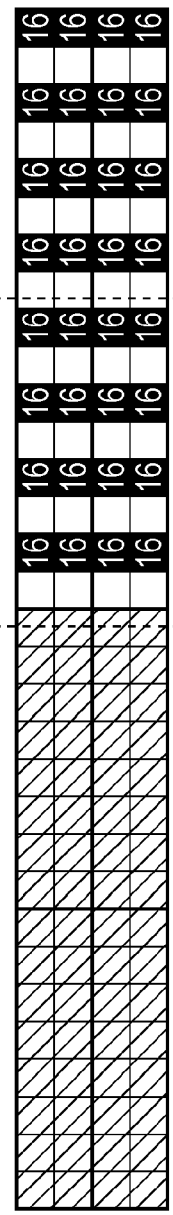
FIGS. 3A to 3D are diagrams showing that luminance variations caused by the compression errors are easily visually recognized when an image including a stripe pattern is scroll-displayed.
Figure 3B:
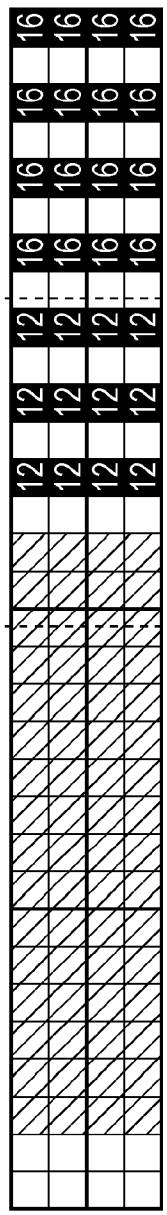
Figure 3C:
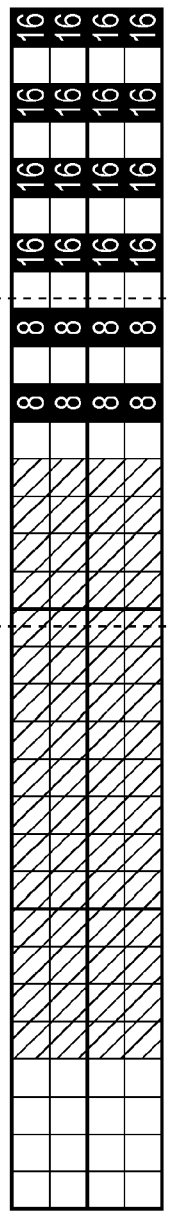
Figure 3D:
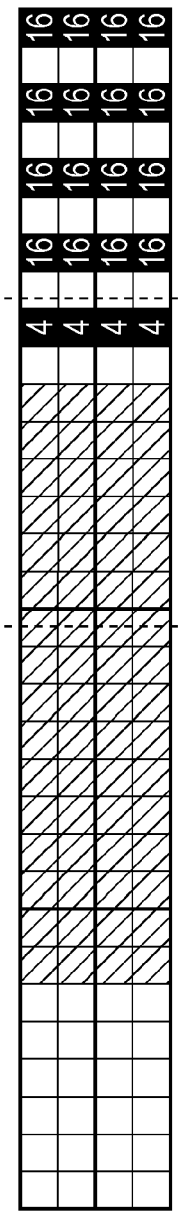

FIGS. 2A and 2B are graphs showing that the compression errors are increased by gamma correction. FIGS. 2A and 2B show a gamma correction curve with the horizontal axis as the input luminance and with the vertical axis as the output luminance (the luminance after gamma correction), as well as show compression errors with the horizontal axis as the input luminance and with the vertical axis as the amount of error. FIG. 2A shows the compression errors prior to gamma correction, whereas FIG. 2B shows the compression errors after gamma correction (that is, the compression error correction unit 5 has yet to perform compression error correction).

As is apparent in FIGS. 2A and 2B, when a decompressed image signal is subjected to gamma correction, the compression errors of the pixels, in particular, those of pixels whose luminance is close to the minimum value (=0) (hereafter referred to as "black pixels") and those of pixels whose luminance is close to the maximum value (hereafter referred to as "white pixels") are increased. This is due to the steepness of the gamma correction curve, in particular, that of the curve portions with respect to the black and white pixels.

These compression errors increased by the gamma correction may be visually recognized as luminance variations. Specifically, when an image including a strip pattern where the black and white pixels are repeatedly arranged at narrow intervals is scroll-displayed, luminance variations caused by the compression errors are easily visually recognized.

FIGS. 3A to 3D are diagrams showing the situation described above, that is, an image including a stripe pattern and a flat pattern that has small luminance variations between adjacent pixels (diagonally shaded regions in the drawings) is gradually scrolled from the left to right in the diagrams. Note that in these diagrams, a pattern in which the black and white pixels are alternately arranged is shown as the stripe pattern.

In FIGS. 3A to 3D, gray, thick frames represent units of compression performed by the compression/decompression unit 3. In the present embodiment, it is assumed that the compression unit is 8 horizontal pixels×2 vertical pixels=16 pixels.

In the present embodiment, compression is performed by differential PCM. However, as described above, differential PCM causes relatively large compression errors, particularly when the image is scrolled as shown in FIGS. 3A to 3D. Specifically, when the image is scrolled as shown in FIGS. 3A to 3D, a state in which only the stripe pattern exists in one compression unit (FIG. 3A) and states in which the stripe pattern is entering the compression unit at different ratios (FIGS. 3B to 3D) are obtained. When only the stripe pattern exists in the compression unit, even if the stripe pattern is scrolled in the compression unit, the luminance values of the black and white pixels forming the stripe pattern do not change (because similar compression errors occur). However, when the flat pattern enters the compression unit as the image is scrolled, the compression errors vary according to the ratio of the entering flat pattern to the compression unit. Thus, the luminance values of the black and white pixels forming the stripe pattern also vary.

Note that the luminance values of the black pixels shown in the diagrams are illustrative only and the values themselves do not count.

As seen above, when the ratio of the entering flat pattern to the compression unit varies as the image is scrolled, the luminance values of the pixels of the stripe pattern close to the boundary with the flat pattern also vary. Such variations in luminance are easily visually recognized as so-called "flicker" by the user.

Further, when the display device 1 is used as a projector, as in the present embodiment, luminance variations caused by the compression errors increased by gamma correction are more easily visually recognized.

Figure 4:
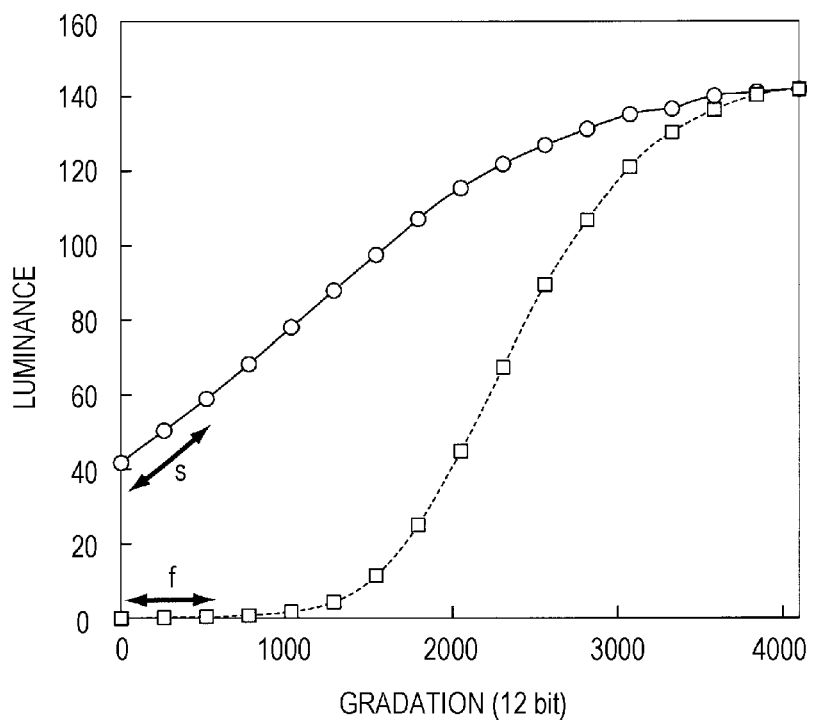
FIG. 4 is a graph showing V-T curves of a liquid crystal panel included in a projector.

FIG. 4 is a graph showing V-T curves (drive voltage-transmittance curves) of a liquid crystal panel (liquid crystal panel 9) included in a projector. In FIG. 4, the horizontal axis represents the gradation of luminance, and the vertical axis represents the display luminance of the liquid crystal panel.

The V-T curve which is a combination of symbols □ and a broken line is a V-T curve when the flat pattern is displayed. The V-T curve which is a combination of symbols ○ and a solid line is a V-T curve of the black pixels (that is, adjacent pixels are white pixels) and is an example of a V-T curve when the stripe pattern is displayed.

The pixel pitch of the liquid crystal panel included in the projector is much narrower than, for example, that of a liquid crystal panel included in a television set. Accordingly, the luminance values of adjacent pixels are easily affected by each other. For this reason, the V-T curve of the black pixels of the stripe pattern shown in FIG. 4 may exhibit characteristics in which the black-side sensitivity is increased, compared to the V-T curve of the flat pattern.

Typically, the black-side sensitivity of the liquid crystal panel is low. Accordingly, even when compression errors occur with respect to the black pixels, corresponding luminance variations (variations in display luminance) are very small, as is apparent in the portion shown by an arrow f, of the V-T curve of the flat pattern in FIG. 4.

On the other hand, if compression errors occur with respect to the black pixels in a state in which the black pixels are affected by the white pixels and thus the black-side sensitivity is increased, larger luminance variations occur, as shown by an arrow s in FIG. 4. That is, the compression errors of the black pixels are more easily visually recognized as luminance variations.

Similarly, the white pixels of the stripe pattern are affected by the adjacent black pixels, although this is not shown in FIG. 4. Thus, the white-side sensitivity is increased, and the compression errors of the white pixels are more easily visually recognized as luminance variations.

As seen above, when the display device 1 is used as a projector, luminance variations of the black and white pixels in the stripe pattern are more easily visually recognized due to the narrowness of the pixel patch of the liquid crystal panel 9.

3. Compression Error Correction

To reduce image quality degradation acting as flicker, compression error correction is performed using the following method in the present embodiment.

That is, the compression error correction unit 5 performs compression error correction by selectively offsetting input luminance values of the image signal which has yet to be subjected to gamma correction by the gradation-dependent correction unit 7.

Specifically, the compression error correction unit 5 performs compression error correction by offsetting input luminance values of the image signal so that the luminance values of the black and white pixels in the image signal are shifted toward halftones.

FIGS. 5A to 5C are graphs showing the outline of the compression error correction of the present embodiment.

FIG. 5A shows a compression error correction curve with the horizontal axis as the input luminance and with the vertical axis as the output luminance, as well as shows the compression errors with the horizontal axis as the input luminance and with the vertical axis as the amount of error. FIG. 5B shows a gamma correction curve with the horizontal axis as the input luminance and with the vertical axis as the output luminance.

In the compression error correction of the present embodiment, input luminance values of the image signal are offset so that the luminance values of the black and white pixels are shifted toward halftones in a manner corresponding to a curve of gamma correction performed by the gradation-dependent correction unit 7. Accordingly, as shown in FIG. 5A, the compression error correction curve exhibits characteristics in which the luminance values of the black pixels are increased and the luminance values of the white pixels are reduced, compared to characteristics when the compression errors are not corrected (characteristics shown by a broken line in the graph).

FIG. 5C shows a correction curve obtained by combining the compression error correction curve shown in FIG. 5A and the gamma correction curve shown in FIG. 5B, as well as shows the compression errors after correction is performed using these correction curves, that is, the compression errors after compression error correction and then gamma correction are performed.

As is apparent in FIG. 5C, by correcting the compression errors prior to gamma correction, an effect of making gentle the steep portions of the gamma correction curve is obtained. This effect is obtained by offsetting input luminance values of the image signal by compression error correction so that the luminance values of the black and white pixels avoid the steep portions of the gamma correction curve.

As a result, the compression errors after the gamma correction are small compared to those when no compression error correction is performed shown in FIG. 2B. Accordingly, it is possible to reduce image quality degradation resulting from the increases in the compression errors caused by the gamma correction (gradation-dependent correction process).

Based on the outline described above, compression error correction performed by the display device 1 (image processing unit 1a) of the present embodiment will be described in detail.

To suppress flicker which is visually recognized when an image is scrolled, particularly, when an image including the stripe pattern described above is scrolled, the following process is performed in the compression error correction of the present embodiment.

In the following description, it is assumed that the luminance value is 12-bit (that is, the luminance value is represented by 4096 gradations).

As described above, the black and white pixels, whose luminance values are to be offset (i.e., to be corrected), are pixels whose luminance values are close to the minimum value (=0) and pixels whose luminance values are the maximum vehicle (=4095), respectively. The black and white pixels have to be pixels whose luminance values are located in the steep portions of the gamma correction curve and which can be corrected, and such pixels have to include at least a pixel having the minimum luminance and a pixel having the maximum luminance. The black pixels may be defined as pixels having luminance values equal to or lower than a first threshold, and the white pixels may be defined as pixels having luminance values equal to or higher than a second threshold (>first threshold).

Note that in the present embodiment, pixels to be actually corrected are pixels for which correction values other than "0" have been obtained by linear interpolation (to be discussed later).

Further, in the compression error correction of the present embodiment, whether to offset the luminance value is determined based on the difference in luminance between the black or white pixel and a pixel in a predetermined range adjacent to the black or white pixel (hereafter referred to as the "adjacent range"). Thus, only the black and white pixels forming the stripe pattern are selectively offset.

FIG. 6 is a diagram showing the adjacent range.

In FIG. 6, a pixel whose compression error is to be corrected (target pixel) is shown by a thick frame. In the present embodiment, a range corresponding to 5×5=25 pixels including up to pixels which are away from the target pixel horizontally or vertically by ±2 pixels is set as the adjacent range.

Note that the adjacent range only has to be determined according to the pitch of the stripe pattern where flicker is visually recognized (the interval at which the black and white pixels are arranged) and is not necessarily limited to the range including up to pixels which are away by ±2 pixels.

In the present embodiment, when a range adjacent to a black or white pixel serving as the target pixel includes any pixel whose luminance difference with the luminance of the black or white pixel is greater than or equal to a predetermined value, the luminance of the black or white pixel is offset.

Specifically, for a black pixel, when the difference (absolute value) in luminance between the black pixel and a pixel having the highest luminance (hereafter referred to as an "adjacent highest luminance pixel") of the pixels in the adjacent range is greater than or equal to a predetermined value, the luminance of the black pixel is offset. For a white pixel, when the difference (absolute value) in luminance between the white pixel and a pixel having the lowest luminance (hereafter referred to as "adjacent lowest luminance pixel") of the pixels in the adjacent range is greater than or equal to a predetermined value, the luminance value of the white pixel is offset.

In the present embodiment, it is assumed that the "difference" is a difference from the luminance of the target pixel. Specifically, the difference="the luminance of the target pixel−adjacent highest (or lowest) luminance pixel".

Accordingly, the sign of the difference with respect to the black pixel is "−", and the sign of the difference with respect to the white pixel is "+".

Further, the compression error correction of the present embodiment, the amount of offset (correction value) of the luminance is changed according to the magnitude of the difference (absolute value) in luminance with the adjacent highest luminance pixel or adjacent lowest luminance pixel. That is, for a black pixel, the luminance value thereof is offset by a correction value corresponding to the difference in luminance with the adjacent highest luminance pixel; for a white pixel, the luminance value thereof is offset by a correction value corresponding to the difference in luminance with the adjacent lowest luminance pixel.

Figure 7A:
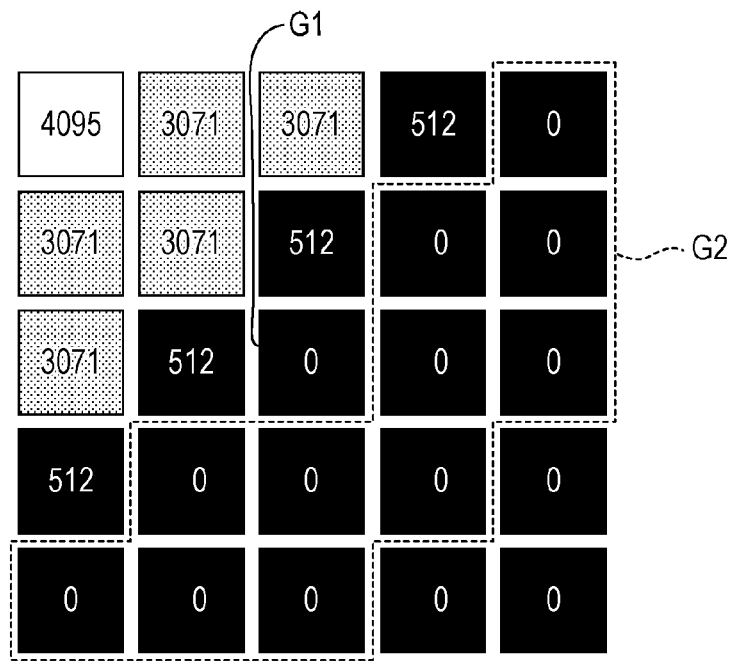
FIGS. 7A and 7B are diagrams showing a specific example of offset of luminance values.
Figure 7B:
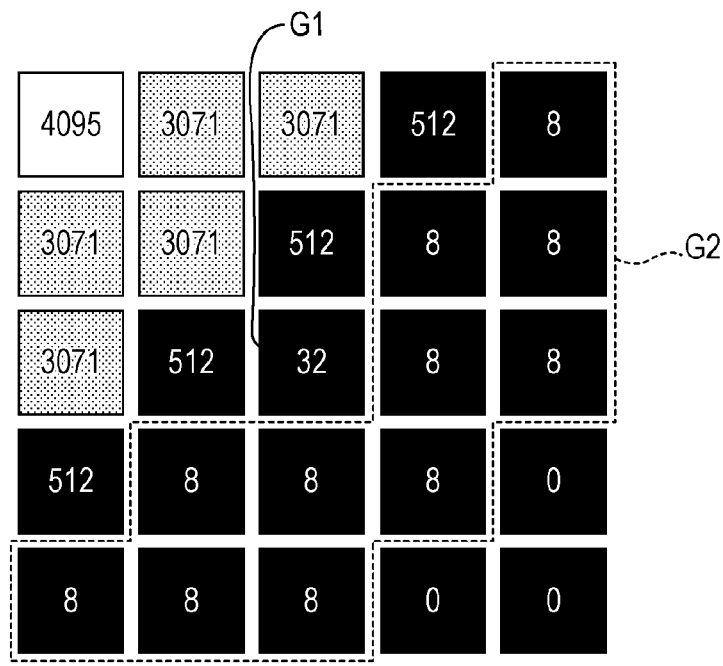

Referring to FIGS. 7A and 7B, there will be described a specific example of offset of the luminance of the present embodiment.

FIG. 7A shows a state before the luminance values are offset (i.e., before compression error correction), and FIG. 7B shows a state after the luminance values are offset.

Note that these diagrams show only offset of the luminance values of the black pixels.

In FIG. 7A, for a black pixel (luminance=0) shown by "G1", the adjacent highest luminance pixel is a black pixel having a luminance value "4095"; for a black pixel shown by "G2", the adjacent highest luminance pixel is a black pixel having a luminance value "3071".

In the present embodiment, for the black pixels, the luminance values of black pixels whose difference in luminance with the adjacent highest luminance pixel is −2560 or less (the absolute value of the difference is greater than or equal to 2560) are offset.

For black pixels other than "G1" and "G2" in FIG. 7A, the difference in luminance with the adjacent highest luminance pixel is greater than −2560. Accordingly, the luminance values of these black pixels are not offset, as shown in FIG. 7B (that is, correction value=0).

For the black pixels to be offset, whose difference in luminance with the adjacent highest luminance pixel is smaller than or equal to −2560, the luminance values thereof are offset using correction values corresponding to the differences in luminance with the adjacent highest luminance pixel, as described above. For this reason, the correction values corresponding to the differences are obtained for these black pixels. In the present embodiment, for the black pixels whose difference in luminance with the adjacent highest luminance pixel is equal to or smaller than −2560, the difference is divided in steps of "512" to change the correction value to be provided. For example, assuming that the correction value is 0 when the difference in luminance with the adjacent highest luminance pixel is −2559, the correction value is 8 when the difference is −3071; the correction value is 16 when the difference is −3583; and the correction value is 32 when the difference is −4095.

Thus, for the black pixel "G2", whose difference in luminance with the adjacent highest luminance pixel is "3071", the luminance value thereof is offset by "8", as shown in FIG. 7B; for the black pixel "G1", whose difference in luminance with the adjacent highest luminance pixel is "4095", the luminance value thereof is offset by "32", as shown in FIG. 7B.

In the present embodiment, the correction values of all the pixels are calculated by linearly interpolating the values stored in the correction value table 6a. This will be described later.

For the white pixels (not shown), as in the offset of the black pixels, the luminance values of pixels whose difference in luminance with the adjacent lowest luminance pixel is greater than or equal to 2560 are offset, and the luminance values are offset by correction values corresponding to the differences in luminance with the adjacent lowest luminance pixel. Note that for the white pixels, the correction values corresponding to the differences in luminance with the adjacent lowest luminance pixel are not values obtained by simply inverting the correction values for the black pixels and are set to values smaller than the correction values for the black pixels. For example, the correction values for the white pixels are set as follows: assuming that the correction value is 0 when the difference in luminance with the adjacent lowest luminance pixel is 2559, the correction value is −5 when the difference is 3071; the correction value is −10 when the difference is 3583; and the correction value is −20 when the difference is 4095.

This is because the black-side portion of the gamma correction curve is steeper than the white-side portion thereof.

Based on the above description, specific process steps performed by the compression error correction unit 5 will be described with reference to a flowchart of FIG. 8. In the present embodiment, the compression error correction unit 5 is configured to perform the following process using hardware.

The process shown in FIG. 8 is a process performed on a one-frame image. The compression error correction unit 5 repeatedly performs the process shown in FIG. 8 on each input frame image.

First, in step S101, the compression error correction unit 5 resets a target pixel identifier n to 0. The target pixel identifier n is an identifier for identifying the target pixel in the input frame image.

In step S102, the compression error correction unit 5 acquires the luminance of the n-th pixel (hereafter referred to as "luminance Ln") and, in step S103, determines whether the luminance Ln is 50% gray (2047 in the present embodiment) or lower.

If the luminance Ln is 50% gray or lower, the compression error correction unit 5 proceeds to step S104 and acquires the luminance of the brightest pixel in a range adjacent to the n-th pixel, that is, the adjacent highest luminance pixel (hereafter referred to as the "adjacent highest luminance KLmax").

In step S105, the compression error correction unit 5 calculates a difference S1 between the adjacent highest luminance KLmax and the luminance Ln and, in step S106, calculates a correction value corresponding to the luminance Ln and the difference S1 on the basis of the values stored in the correction value table 6a stored in the memory 6 shown in FIG. 1.

FIG. 9 is a diagram showing the correction value table 6a.

The correction value table 6a of the present embodiment is storing correction values corresponding to representative correction points shown by symbols ○ in FIG. 9. The representative correction points are points set to combinations of luminance values (vertical axis: 0 to 4096) and differences (horizontal axis: −4096 to 4096) which are both divided in steps of 512.

Since gray-out regions in FIG. 9 are regions including combinations of the luminance Ln and the difference which do not actually occur (regions including combinations where the absolute value of the difference exceeds "4095−luminance Ln"), no representative correction points are set to the regions. Accordingly, of points (9×9+9×9=162 points) obtained in a matrix of the luminance and difference in steps of 512, 9×9=81 points shown by symbols ○ in FIG. 9 are points corresponding to combinations of the luminance Ln and the difference which can actually occur, and these 81 points are determined as representative correction points.

In the correction value table 6a of the present embodiment, a correction value 0 is set to all the representative correction points other than a representative correction point shown by "B1" (a point corresponding to a combination of a luminance value 0 and a difference −4096), a representative correction point shown by "B2" (a point corresponding to a combination of a luminance value 0 and a difference −3584), a representative correction point shown by "B3" (a point corresponding to a combination of a luminance value 0 and difference −3072), a representative correction point shown by "W1" (a point corresponding to a combination of a luminance value 4096 and a difference 4096), a representative correction point shown by "W2" (a point corresponding to a combination of a luminance value 4096 and a difference 3584), and a representative correction point shown b "W3" (a point corresponding to a combination of a luminance value 4096 and a difference 3072).

The following values are set to the representative correction points "B1", "B2", "B3", "W1", "W2", and "W3".

"B1"=32; "B2"=16; "B3"=8; "W1"=−20; "W2"=−10; and "W3"−5

Since the correction value 0 is set to the representative correction points other than "B1", "B2", "B3", "W1", "W2", and "W3" as described above, only the luminance values of the black pixels (luminance Ln=0) and white pixels (luminance Ln=4095) are offset using the correction values, as described above.

Further, since the different correction values are set to the representative correction points "B1", "B2", "B3", "W1", "W2", and "W3" as described above, the amount of offset of the luminance can be changed according to the magnitude of the difference in luminance with the adjacent highest luminance pixel or adjacent lowest luminance pixel, as described above.

In the present embodiment, the correction values for all the target pixels are calculated by linearly interpolating the correction values corresponding to the representative correction points. Thus, correction values can be obtained with respect to combinations of the luminance Ln and the difference which exist between the representative correction points.

Specifically, correction values set to four representative correction points which are closest to the combination of the luminance Ln and the difference of the target pixel are linearly interpolated.

For example, if the target pixel is [luminance Ln=0, difference=−4000], correction values are obtained by linearly interpolating the correction values of four points which are closest to the combination [luminance Ln=0, difference=−4000], that is, a point [luminance value=0, difference=−4096], a point [luminance value=0, difference=−3584], a point [luminance value=512, difference=−3584], and a point [luminance value=512, difference=−4096]. Since the last point [luminance value=512, difference=−4096] is not a representative correction point, it has no correction value. For such points (points shown by symbols ● in FIG. 9) which are not representative correction points and thus have no correction values but have to obtain correction values to perform linear interpolation, the correction values of the representative correction points adjacent to these points in the direction of the horizontal axis (in the direction of the difference) are copied and used as shown in FIG. 9.

If the target pixel is [luminance Ln=0, difference=−3071], correction values are obtained by linearly interpolating the correction values of four points which are closest to the combination [luminance Ln=0, difference=−3071], that is, a point [luminance value=0, difference=−3072], a point [luminance value=0, difference=−3584], a point [luminance value=512, difference=−3072], and a point [luminance value=512, difference=−3584].

In this way, the correction values of all the target pixels are calculated by linear interpolation.

Note that the correction values stored in the correction value table 6a are not limited to the values described above.

In step S106, the compression error correction unit 5 calculates a correction value for the n-th pixel by linearly interpolating the values stored in the correction value table 6a as described above.

The compression error correction unit 5 then proceeds to step S110 and adds the calculated correction value to the luminance Ln.

If the luminance Ln is not 50% gray or lower in step S103, the compression error correction unit 5 proceeds to step S107 and acquires the luminance of the darkest pixel in a range adjacent to the n-th pixel, that is, the adjacent lowest luminance pixel (hereafter referred to as the "adjacent lowest luminance KLmin").

In step S108, the compression error correction unit 5 calculates a difference S2 between the adjacent lowest luminance KLmin and the luminance Ln and, in step S109, calculates a correction value corresponding to the luminance Ln and the difference S2 on the basis of the values stored in the correction value table 6a.

The method for calculating a correction value corresponding to the luminance Ln and the difference S2 on the basis of the values stored in the correction value table 6a is similar to that described in step S106 and therefore will not be described repeatedly.

The compression error correction unit 5 then proceeds to step S110 and adds the calculated correction value to the luminance Ln.

The compression error correction unit 5 then proceeds to step S111 and determines whether n≥N, that is, whether the target pixel identifier n is greater than or equal to the number of pixels N forming the frame image.

If n is not greater than or equal to N in step S111, that is, if all the pixels in the frame image have yet to be processed in step S111, the compression error correction unit 5 proceeds to step S112 and increments the target pixel identifier n (n←n+1) and then returns to step S102. Steps S102 to S110 are repeated until the addition in step S110 is performed with respect to all the pixels in the input frame image.

If n≥N in step S111, that is, if all the pixels in the frame image have been processed in step S111, the compression error correction unit 5 completes the series of process steps shown in FIG. 8.

The example where the compression error correction unit 5 calculates correction values and add the correction values with respect to all the pixels forming the frame image has been described, it may, of course, calculate correction values and add the correction values with respect to only the black and white pixels.

While the example where representative correction points are determined with respect to combinations of the luminance Ln and the difference and then correction values to be added are calculated by linearly interpolating the correction values of the representative correction points has been described, the method for acquiring correction values is not limited to the above method.

For example, correction values may be acquired by previously preparing a table where a correction value to be added is associated with each combination of the luminance Ln and the difference and subsequently acquiring correction values corresponding to combinations of the luminance Ln and the difference from this table. Alternatively, correction values may be calculated using a function representing the relationship between the luminance Ln and the difference.

In the display device 1 (image processing unit 1a) of the present embodiment, the compression error correction unit 5 performs compression error correction as described above when moving images are displayed on the liquid crystal panel 9 and does not perform it when still images are displayed thereon.

Specifically, in the image processing unit 1a of the present embodiment, the control unit 10 determines which of moving images and still images are displayed on the liquid crystal panel 9 and, if still images are displayed, performs control so that the compression error correction unit 5 does not perform compression error correction.

As described with reference to FIG. 3, when an image including a stripe pattern is scrolled, flicker (image quality degradation) caused by increases in the compression errors is easily visually recognized. Since such scroll is performed when moving images are displayed, it is possible to perform compression error correction efficiently when image quality degradation is likely to occur, by performing compression error correction when moving images are displayed as described above. In other words, compression error correction is not performed when still images are displayed, because flicker caused by increases in the compression errors is not easily visually recognized when still images are displayed. Thus, it is possible to omit an unnecessary process to reduce the load of image processing.

4. Summary of Embodiment

As described above, the image processing unit 1a (image processing device) of the present embodiment includes the compression/decompression unit 3 (decompression unit) configured to decompress a compressed image signal and the gradation-dependent correction unit 7 configured to perform gradation-dependent correction, which is a correction process in which the amount of correction varies among luminance gradations.

The image processing unit 1a also includes the compression error correction unit 5 configured to perform, on a decompressed image signal which has yet to be subjected to gradation-dependent correction, compression error correction in which the input luminance values are selectively offset.

Thus, it is possible to shift the luminance values to portions other than steep portions of the gradation-dependent correction curve prior to gradation-dependent correction.

Thus, increases in the amounts of the compression errors caused by gradation-dependent correction can be reduced. As a result, image quality degradation resulting from increases in the compression errors caused by the gradation-dependent correction can be reduced.

Since the image quality degradation resulting from increases in the compression errors can be reduced, the increases in the compression errors can be tolerated. Typically, when the compression rate is increased, the compression errors are increased. Accordingly, if the increases in the compression errors can be tolerated, the compression rate can be increased. By increasing the compression rate, it is possible to reduce the capacity of the frame memory for image processing (memory 4) and the necessary band to reduce the system size and cost.

Further, in the image processing unit 1a of the present embodiment, the gradation-dependent correction unit 7 performs gamma correction as a gradation-dependent correction process, and the compression error correction unit 5 shifts the luminance values of the black and white pixels in the image signal toward halftones as a compression error correction process.

Thus, it is possible to shift the luminance values to portions other than steep portions of the gamma correction curve. As a result, when the gradation-dependent correction process is gamma correction, it is possible to reduce increases in the amounts of the compression errors caused by the gradation-dependent correction to reduce image quality degradation resulting from the increases in the compression errors caused by the gradation-dependent correction.

Further, the image processing unit 1a of the present embodiment includes the control unit 10 configured to determine which of moving images and still images are displayed based on an image signal and, when still images are displayed, performs control so that compression error correction is not performed.

Thus, during display of still images, when flicker caused by increases in the compression errors are not easily visually recognized, compression error correction is not performed.

As a result, it is possible to omit an unnecessary process to reduce the load of image processing.

Further, in the image processing unit 1a of the present embodiment, the compression error correction unit 5 performs compression error correction by offsetting the luminance of each black pixel using a value corresponding to the difference (S1) between the luminance of the black pixel and the luminance of a pixel having the highest luminance (KLmax) of pixels in a predetermined range adjacent to the black pixel and offsetting the luminance of each white pixel using a value corresponding to the difference (S2) between the luminance of the white pixel and the luminance of a pixel having the lowest luminance (KLmin) of pixels in a predetermined range adjacent to the white pixel.

Thus, the luminance of each black pixel is offset using a value corresponding to the difference in luminance between the black pixel and the brightest pixel of the pixels adjacent to the black pixel, and the luminance of each white pixel is offset using a value corresponding to the difference in luminance between the white pixel and the darkest pixel of the pixels adjacent to the white pixel.

As a result, it is possible to prevent excessive offset of the luminance values and to prevent image quality degradation caused by compression error correction.

Further, the image processing unit 1a of the present embodiment sets the amount of offset (correction value) of the luminance of each black pixel to a larger value than the amount of offset (correction value) of the luminance of a corresponding white pixel in a compression error correction process.

Thus, the black and white pixels are offset by proper amounts of offset corresponding to the steepness of the steep portions of the gamma correction curve.

As a result, it is possible to prevent excessive offset of the luminance values and to prevent image quality degradation caused by compression error correction.

6. Modification

While the embodiment of the present technology has been described, the present technology is not limited thereto.

For example, while the example where the gradation-dependent correction process is gamma correction has been described, the present technology is also applicable to other gradation-dependent correction processes such as color unevenness correction and overdrive.

Even when gradation-dependent correction other than gamma correction is performed, the luminance values can be offset in such a manner that steep portions of the correction curve are avoided, by selectively offsetting the input luminance values of a decompressed image signal which has yet to be subjected to gradation-dependent correction. As a result, it is possible to reduce increases in the amounts of the compression errors caused by gradation-dependent correction and to reduce image quality degradation resulting from the increases in the compression errors caused by the gradation-dependent correction.

While the example where a determination on which of moving images and still images are displayed is made based on an image signal has been described, such determination may be made based on which of moving-image mode and still-image mode is set. For example, if moving-image mode in which image processing suitable for displaying moving images is performed and still-image mode in which image process suitable for displaying still images is performed are selectively set, a determination on which of these modes is set may be used as the determination on which of moving images and still images are displayed.

While the example where compression error correction is not performed when still images are displayed has been described, the user may make, through an operation, a selection as to whether compression error correction is not performed when still images are displayed.

While the example where the present technology is applied to a projector has been described, the present technology is also suitably applicable to a wide range of devices which perform image processing, including display devices other than projectors.

Note that the effects described in the present specification are illustrative only and there may be other effects.

The present technology may be configured as follows:

(1) An image processing device including: a decompression unit configured to decompress a compressed image signal; a gradation-dependent correction unit configured to perform gradation-dependent correction on the decompressed image signal, the gradation-dependent correction being a correction process in which the amount of correction varies among luminance gradations; and a compression error correction unit configured to perform compression error correction in which input luminance values are selectively offset, on the decompressed image signal which has yet to be subjected to the gradation-dependent correction.

(2) The image processing device according to the above (1), wherein the gradation-dependent correction unit performs gamma correction as the gradation-dependent correction, and wherein the compression error correction unit offsets, as the compression error correction, luminance values of black and white pixels in the image signal in such a manner that the luminance values are shifted toward halftones.

(3) The image processing device according to the above (2), further including a control unit configured to determine which of a moving image and a still image is displayed based on the image signal and to perform control so that the compression error correction is not performed when the still image is displayed.

(4) The image processing device according to the above (2) or (3), wherein, as the compression error correction, the compression error correction unit offsets the luminance value of the black pixel using a value corresponding to a difference in luminance between the black pixel and a pixel having the highest luminance of pixels in a predetermined range adjacent to the black pixel and offsets the luminance value of the white pixel using a value corresponding to a difference in luminance between the white pixel and a pixel having the lowest luminance of pixels in a predetermined range adjacent to the white pixel.

(5) The image processing device according to any one of (2) to (4), wherein in the compression error correction, the amount of offset of the luminance value of the black pixel is set to a larger value than the amount of offset of the luminance value of the white pixel.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
    a decompression unit configured to decompress a compressed image signal;
    a gradation-dependent correction unit configured to perform gradation-dependent correction on the decompressed image signal, the gradation-dependent correction being a correction process in which the amount of correction varies among luminance gradations; and
    a compression error correction unit configured to perform compression error correction in which input luminance values are selectively offset, on the decompressed image signal which has yet to be subjected to the gradation-dependent correction.

2. The image processing device according to claim 1,
    wherein the gradation-dependent correction unit performs gamma correction as the gradation-dependent correction, and
    wherein the compression error correction unit offsets, as the compression error correction, luminance values of black and white pixels in the image signal in such a manner that the luminance values are shifted toward halftones.

3. The image processing device according to claim 2, further comprising a control unit configured to determine which of a moving image and a still image is displayed based on the image signal and to perform control so that the compression error correction is not performed when the still image is displayed.

4. The image processing device according to claim 2, wherein, as the compression error correction, the compression error correction unit offsets the luminance value of the black pixel using a value corresponding to a difference in luminance between the black pixel and a pixel having the highest luminance of pixels in a predetermined range adjacent to the black pixel and offsets the luminance value of the white pixel using a value corresponding to a difference in luminance between the white pixel and a pixel having the lowest luminance of pixels in a predetermined range adjacent to the white pixel.

5. The image processing device according to claim 2, wherein in the compression error correction, the amount of offset of the luminance value of the black pixel is set to a larger value than the amount of offset of the luminance value of the white pixel.

6. A method for processing an image, comprising:
    decompressing a compressed image signal;
    performing gradation-dependent correction on the decompressed image signal, the gradation-dependent correction process being a correction process in which the amount of correction varies among luminance gradations; and performing compression error correction in which input luminance values are selectively offset, on the decompressed image signal which has yet to be subjected to the gradation-dependent correction.

\* \* \* \* \*